United States Patent [19]
Lindemann

[11] 3,813,748
[45] June 4, 1974

[54] PRE-TURNING MACHINE FOR WIRE OR ROD STOCK

[75] Inventor: Wolfgang Lindemann, Aachen, Germany

[73] Assignee: Orbit Beratungsgesellschaft GmbH, Aachen, Germany

[22] Filed: Sept. 11, 1972

[21] Appl. No.: 287,711

[30] Foreign Application Priority Data
Oct. 18, 1971  Germany............................ 2151804

[52] U.S. Cl. ................................. 29/105 R, 29/97
[51] Int. Cl. ........................................... B26d 1/12
[58] Field of Search ....... 29/97, 96, 95, 567, 105 R, 29/105 A; 82/1 C, 20

[56] References Cited
FOREIGN PATENTS OR APPLICATIONS
1,068,974  11/1959  Germany................................ 29/96
616,204  1/1949  Great Britain........................ 82/1 C

*Primary Examiner*—Leonidas Vlachos
*Attorney, Agent, or Firm*—Craig & Antonelli

[57] ABSTRACT

A pre-turning machine with a rotatingly driveable cutting head for pre-turning wire or rod stock is disclosed having radially adjustable cutting blades and having arranged behind the cutting blades in the direction of advance at least one blade for smoothing the outer surfaces of the pre-turned stock. This smoothing blade is firmly arranged on the cutting head and is provided with a straight cutting edge.

3 Claims, 2 Drawing Figures

PRE-TURNING MACHINE FOR WIRE OR ROD STOCK

BACKGROUND OF THE INVENTION

The present invention relates to a machine having a rotatingly driveable cutting head for pre-turning wire or rod stock. The machine has radially engageable cutting blades and has, arranged behind the cutting blades in the direction of advance, a tool for smoothing the outer surface of the pre-turned stock.

With a known pre-turning machine of this type, it has been attempted to solve the problem of considerably increasing the feed velocity of the stock to be worked through the machine and also of achieving a good finished surface with this increased feed velocity. This problem was solved by arranging the blades so as to be rotatingly adjustable about a radially directed axis. This teaching brought the surprising result that the feed velocity per revolution could now be increased several times as compared to known pre-turning machines. This is preferably desired in the case of rough turning since it is then possible to attain a high production with the employment of a correspondingly high operating performance. Since by increasing the feed velocity per revolution the blades are engaged in conformance with the diameter and pitch of the helical line which every turning tool leaves on the work piece, it was further proposed to design the cutting blades in such a way that at least one part of every cutting edge has a concavely curved form. If in addition a cutting jet is arranged behind the cutting head, practically every desired grade of surface can be attained. Tests have confirmed that only by means of a difference in shading can it be determined whether a rod has been worked with a known pre-turning machine having a low feed velocity or with a machine having a high feed rate.

It is an object of the present invention to design pre-turning machines for wire and rod stock which have radially adjustable cutting blades so that one is in the position to employ as a blade conventional blades which have at least one chamfering edge, without having to provide a cutting jet for smoothing the preturned surfaces. It should also not be required to arrange on a cutting head cutting blades of a special type, namely, such blades whose edges have a concavely curved form on at least one part.

SUMMARY OF THE INVENTION

In accomplishing these objects according to the present invention, at least one smoothing blade having a straight edge and being firmly arranged on the cutting head is provided. During the course of turning under conditions of proportionately high blade angle and proportionately high feed rate, known cutting blades produce helically extending cutting lines, between each of which an edgeshaped bur is formed. This bur is then removed by the additionally provided smoothing blade so that after turning, the marks of the helical lines are also now perceptible only as shadows or in very weak form (lying within the permitted tolerance).

Further features, advantages and details of the invention will become apparent from the following detailed description of a specific embodiment when considered in view of the accompanying drawings.

DETAILED DESCRIPTION OF THE INVENTION

Figure 1:
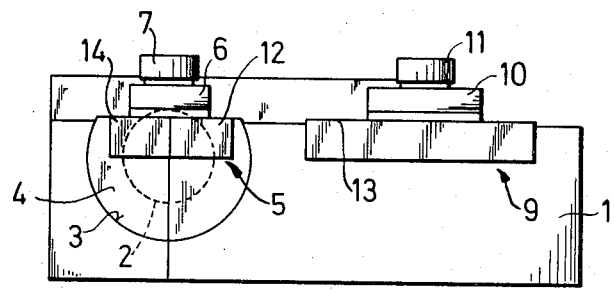
FIG. 1 is a frontal view of a tool holder base having an engageable cutting blade of conventional type and an additional smoothing blade.
Figure 2:
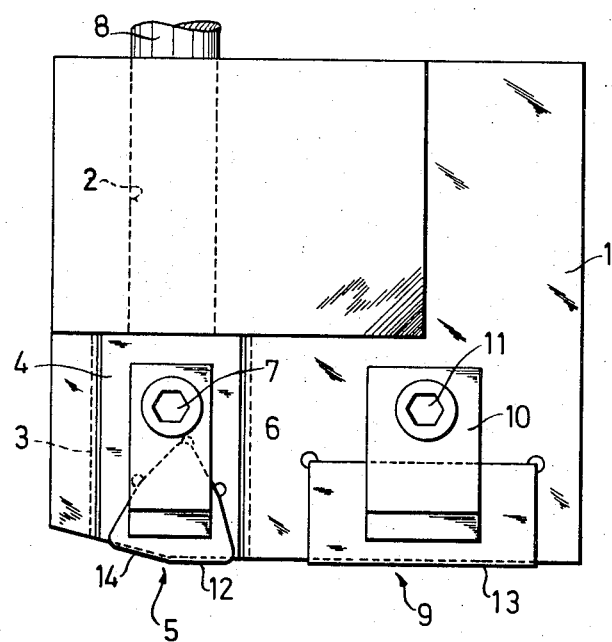
FIG. 2 is a top view of FIG. 1.

A base 1 arranged in a cutting head of a pre-turning machine has both a cylindrical recess 3 and a bore 2. The tool holder 4 for a conventional cutting blade 5, which is attachable on the tool holder 4 by means of a plate 6 and screw 7, is engageable and secureable by means of a rod 8 or the like. Also on the base 1 is a smoothing blade 9 secured by way of a plate 10 and a screw 11 so that the flat cutting edge 12 of the cutting blade 5 and the edge 13 of the smoothing blade 9 practically completely border on an imaginary straight line when the cutting blade 5 is not in operation. The result is thereby achieved that the bur being formed between adjacent cutting tracks in the course of preturning with engaged cutting blades is removed by means of the smoothing blade 9. In order to accentuate the surfaces coordinated underneath the edges 12 and 13 as well as the chamfering edge 14 in FIG. 1, these are provided with parallel vertical lines. If the cutting blade 5 has no flat cutting edge, the end of the chamfering edge 14 must lie at the same height or higher than the flat edge 13 of the smoothing blade 9.

Since the cutting blade 5 and the smoothing blade 9 are subjected to different loads, it is suitable to construct these blades out of different materials. The rake angle of these blades can also be differently dimensioned.

The smoothing blade or blades provided can (which is not seen from the drawings) be arranged as a control means for the cutting force measuring means. One is thereby in the position to constantly ascertain the cutting pressure. Deviations in the cutting pressure permit inference as to imperfections in the material surface which may still be present, since the engaged cutting blades have certainly already eliminated the roughest defects in the material and therefore, these no longer enter into the measurement.

Since the additionally provided smoothing blade or blades take away burs and eneven spots left as a residue from pre-turning, it is also possible with high feed velocity to achieve the result that relatively few cutting blades can be provided on the cutting head, e.g., four cutting blades. It is not necessary to arrange a cutting blade 5 and a smoothing blade 9 on the same base 1; it is possible, for example, to provide cutting blades 5 on three bases and to arrange a smoothing blade 9 on a fourth base.

What is claimed is:

1. A pre-turning machine comprising: a rotatingly driveable cutting head for pre-turning wire or rod stock, cutting blades rotatingly adjustable about a radially directed axis and means for smoothing the outer surfaces of the pre-turned stock disposed behind the cutting blades in the direction of advance of the pre-turned stock, said smoothing means including at least one blade fixedly mounted on said cutting head at a predetermined distance from said cutting blades, said at least one blade being provided with a straight cutting edge for smoothing the outer surfaces of the pre-turned stock.

2. A pre-turning machine according to claim 1, wherein said smoothing blade is arranged on the base of one of the cutting blades.

3. A pre-turning machine according to claim 1, wherein the smoothing blade is arranged as the single blade on a base.

\* \* \* \* \*